No. 746,654. PATENTED DEC. 15, 1903.
T. ADAIR.
MACHINE FOR SOWING SEEDS.
APPLICATION FILED MAY 20, 1903.
NO MODEL. 2 SHEETS—SHEET 1.
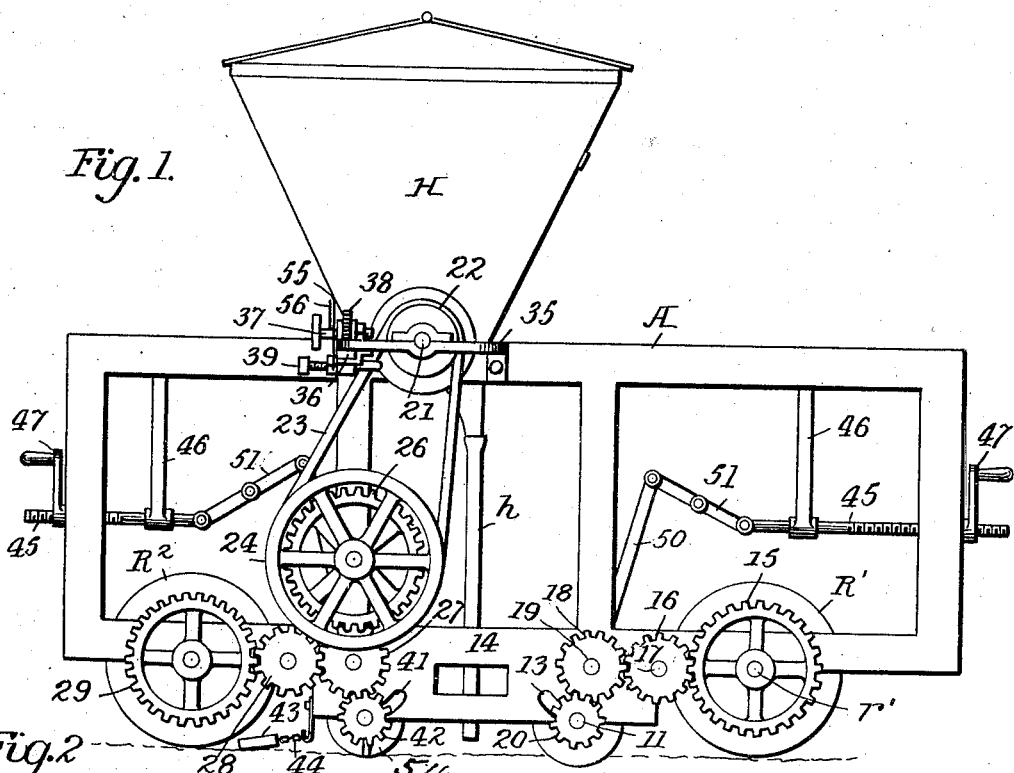
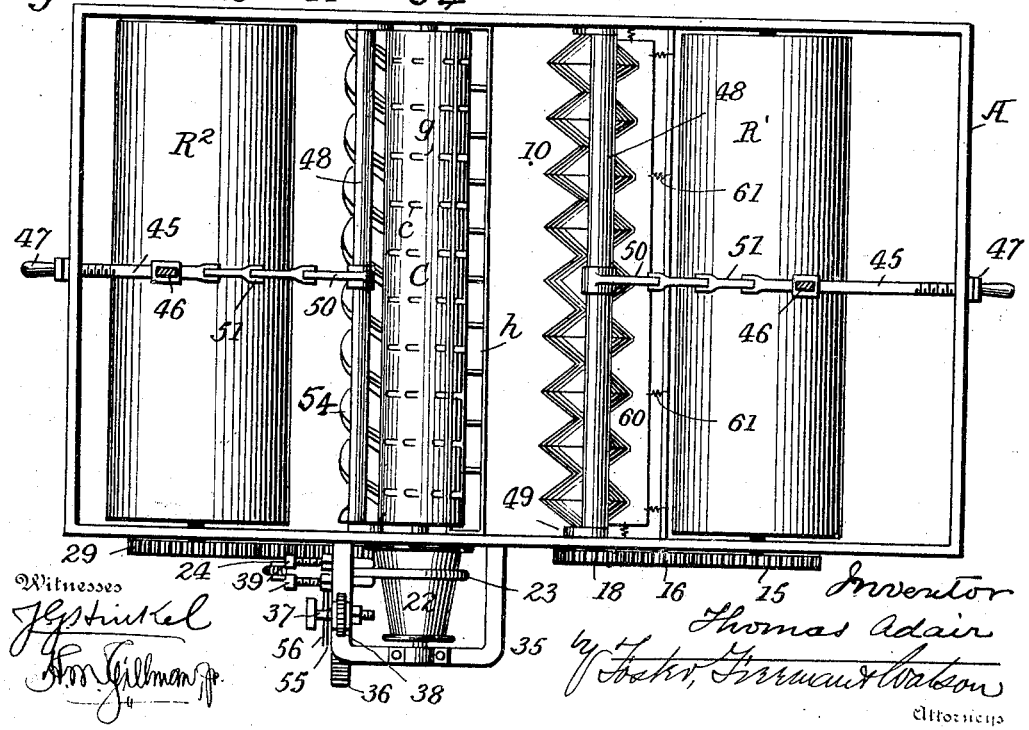

No. 746,654. PATENTED DEC. 15, 1903.
T. ADAIR.
MACHINE FOR SOWING SEEDS.
APPLICATION FILED MAY 20, 1903.
NO MODEL. 2 SHEETS—SHEET 2.
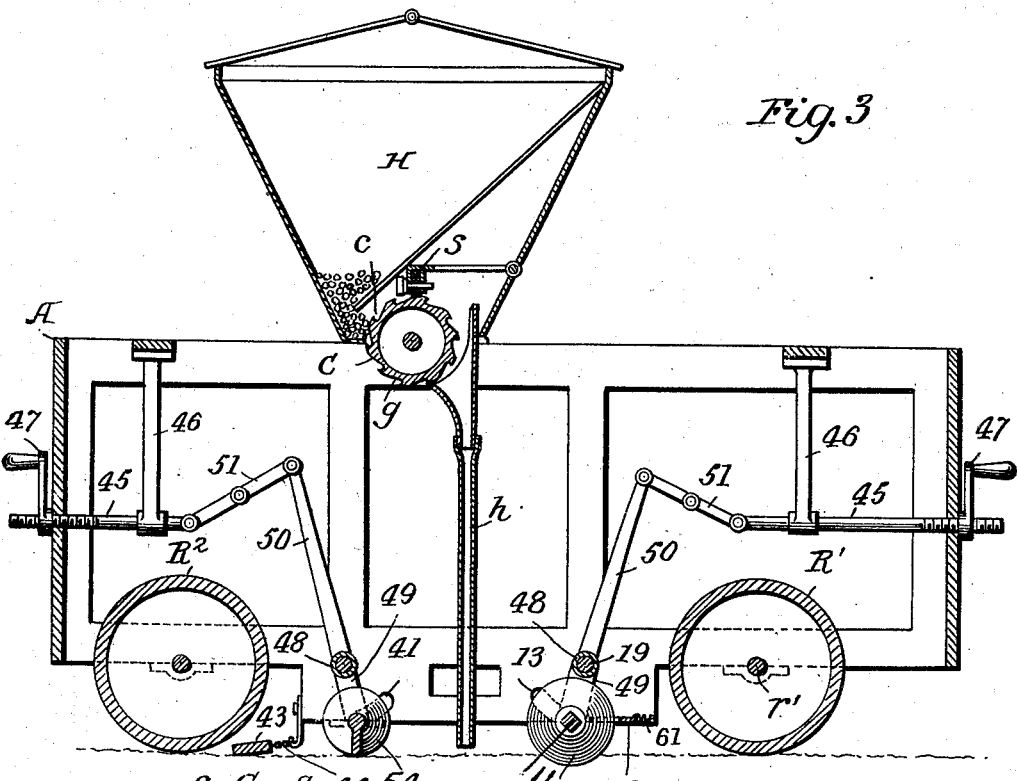
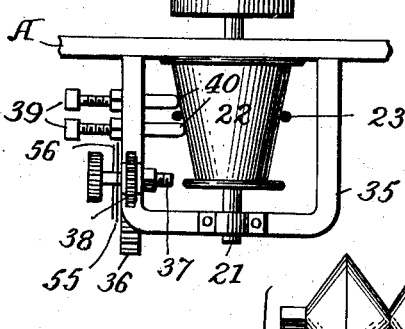
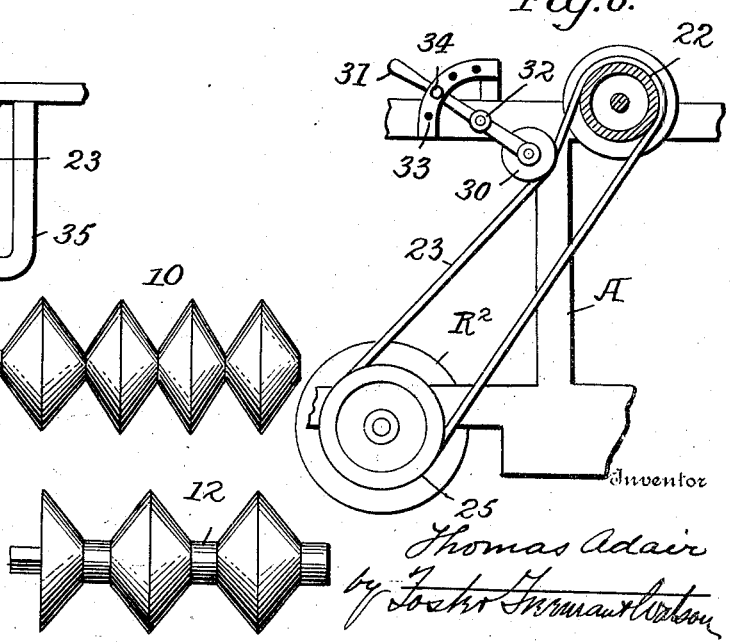

No. 746,654. Patented December 15, 1903.

UNITED STATES PATENT OFFICE.

THOMAS ADAIR, OF BELFAST, IRELAND.

MACHINE FOR SOWING SEEDS.

SPECIFICATION forming part of Letters Patent No. 746,654, dated December 15, 1903.

Original application filed August 3, 1901, Serial No. 70,839. Divided and this application filed May 20, 1903. Serial No. 158,048. (No model.)

*To all whom it may concern:*

Be it known that I, THOMAS ADAIR, a subject of the King of England, residing at Belfast, Ireland, have invented certain new and useful Improvements in Machines for Sowing Seed, of which the following is a specification.

This invention relates to machines for sowing seed and is a division of an application filed by me August 3, 1901, Serial No. 70,839. The object of the invention is to provide a machine for sowing the seeds of the flax and hemp plants and of the cereals and all the smaller sorts of seeds used in agriculture, in which machine provision is made for forming the drills, depositing the seed in the bottom of the drills at a uniform or nearly uniform depth and at equal or nearly equal distances apart, covering the seed, and rolling the sowings when made.

The invention will be fully described hereinafter, reference being had to the accompanying drawings, in which—

Figure 1 is a side elevation of a machine embodying my invention. Fig. 2 is a plan view with the seed-hopper removed. Fig. 3 is a vertical longitudinal section. Fig. 4 is a detail view of the means employed for varying the speed of rotation of the seed-cylinder. Fig. 5 is a view showing two forms of the drill-former, and Fig. 6 is a modification of the driving means for the seed-cylinder.

The frame A is supported upon front and rear rollers $R'$ and $R^2$, and the frame in turn supports all the operating mechanism. It is to be assumed, of course, that the ground is properly prepared for seeding, and the first thing is to form the drills for the reception of the seed. These may be formed in various ways; but preferably I employ for this purpose a series of truncated cones 10, arranged in pairs, with their bases abutting upon a shaft 11 in such manner that they will turn with the shaft, but preferably readily removable therefrom. The cones of each pair may be fastened together or they may simply abut. The small ends of adjacent cones may abut or they may be separated by thimbles 12 on the shaft, and obviously different-sized thimbles may be employed to separate adjacent pairs of cones to any desired extent, so that drills will be formed at the proper distance apart for the particular seed being sown. The shaft 11 is supported at each end in a curved slot 13 in side plates 14 on the frame for a purpose to be hereinafter referred to.

It is of course necessary to provide some means for rotating the shaft 11, and in the present case the shaft $r'$ of the roller $R'$ is provided with a gear 15 at one end outside the frame, which meshes with a pinion 16 on a shaft 17, journaled in the frame, and this in turn meshes with another pinion 18 on a shaft 19, and the pinion 18 meshes with a pinion 20 on the end of the shaft 11. This gearing may be duplicated on the opposite side of the machine, if desired.

Supported on the frame is a seed-hopper H, in the lower end of which a seed-cylinder C is supported to rotate, and said cylinder is provided with circumferential rows of seed-pockets $c$, from each of which a short hollow groove $g$ extends, so that one, two, or three seeds shall pass over by the revolution of the cylinder from the bottom of the hopper into the upper ends of the seeding-tubes $h$. The passage of superfluous seeds is prevented by means of an adjustable strip of cork, rubber, or other light material (indicated by $s$) and which may be moved toward or away from the cylinder, as desired.

Some means must be provided for rotating the seed-cylinder, and in the present case one end of the cylinder-shaft 21 projects beyond the side of the frame and is provided with a cone-pulley 22. A cord or belt 23 passes round the cone-pulley 22 and another pulley 24, supported by the side of the frame, the pulley 24 being driven in any suitable manner—as, for instance, by a train of gears 26, 27, 28, and 29, the latter being connected to and turning with the roller $R^2$ and the gear 26 being connected to the pulley 24.

Instead of employing the gearing a pulley 25 may be connected to the roller $R^2$ to turn with it, and the belt 23 will run from this pulley to the cone-pulley 22, as shown in Fig. 6. To prevent slackness of the belt when it is shifted toward the small end of the cone-pulley, I provide a pulley 30, journaled on the end of a lever 31, pivoted at 32 to the frame, which pulley engages the belt 23, and by shifting the lever 31 more or less slack will be taken up. The lever may move over a rack 33 and be secured in place by a screw 34.

It will sometimes be necessary to change the speed of rotation of the seed-cylinder to effect a thick or a thin sowing, and to do this the belt 23 will be shifted on the cone-pulley 22 either toward or away from the small end thereof, as the case may be. Various means may be employed for this purpose, and one means is shown in the accompanying drawings. A frame 35 projects out from the side of the main frame A, and a rack 36 is supported to slide on said frame substantially parallel to the cylinder-shaft. A short shaft 37 is journaled in the frame 35 and carries a pinion 38, which extends through a slot in the frame and meshes with the rack 36, and the shaft is provided with a knob by which it can be turned. Two fingers 39 are adjustably supported by the rack and extend one on each side of the belt 23, and it is obvious that by shifting the rack endwise the belt will be correspondingly shifted on the cone-pulley, and the speed of the seed-cylinder may thus be varied. Instead of moving the belt on the pulley the latter may be moved while the belt is held against movement.

To prevent undue friction between the belt and the fingers, the latter are covered by hollow cylinders 40, which turn on the fingers when the belt is moving.

The seed having been deposited in the drills, it is necessary to cover it, and while this may be accomplished in various ways I preferably employ an Archimedean screw 54, journaled in curved slots 41 in the side plates of the frame. The journal of the screw projects at one end beyond the frame and is provided with a pinion 42, which meshes with the pinion 27, and the Archimedean screw is thereby rotated when the machine is moving. This rotation effects the leveling of the soil and fills the drills and covers the seed. In addition to the screw I may also employ a trailing bar 43, connected to the machine by chains 44 or similar means. The roller R² finally presses the soil over the seed, and the seeding is then completed.

It is necessary when the machine is being moved without sowing seed that the drill-forming devices and the Archimedean screw 54 be elevated out of contact with the ground, and that is the reason for journaling them in the curved slots. Various means may be employed for elevating these parts, and in the drawings I have shown a rod 45, slidably supported in a standard 46 and the end of the frame A, and the outer end of the rod is threaded, and a hand-nut 47 works on this end and engages the frame A.

Upon the shaft 19 is loosely fitted a sleeve 48, from each end of which an arm 49 projects, said arms having eyes through which the shaft 11 extends. A lever 50 is rigidly connected at its lower end to the sleeve 48, and its upper end is connected by links 51 to the end of the rod 45. It is obvious that by moving the rod 45 outwardly the lever 50 will be operated to lift the shaft 11 and its truncated cones upwardly. By this arrangement the depth of the drills may also be regulated, as the arms 49 will securely support the shaft 11 and its truncated cones and permit their rotation at any point intermediate the ends of the curved slots 13.

The above mechanism is duplicated at the other end of the machine for the purpose of elevating the Archimedean screw 54. In this case the sleeve 48 is supported upon the shaft which carries the gear 27. It is unnecessary to again specifically describe this mechanism, and it suffices to say that by it the Archimedean screw can be adjusted to any desired position.

Preferably a dial 55 will be fixed to the frame 35 and a pointer 56 be carried by the shaft 37. On the dial will be marks indicating the number of seed the cylinder will deliver per square yard or other standard surface of the seed-bed when the belt is in a certain position on the cone-pulley, and the parts will be so arranged that by turning the shaft 37 until the pointer indicates a certain number the belt will be moved to the proper position on the cone-pulley to rotate the seed-cylinder at the proper speed to deliver that number of seed to the given area.

It is necessary to provide some means for preventing the soil from accumulating on the drill-forming cones, and, as shown, I provide a serrated strip of metal 60, the teeth of which are adapted to the shape, number, and distance of the truncated cones. It is supported in any suitable manner on the frame of the machine, and spiral springs 61 hold it yieldingly in contact with the truncated cones.

Without limiting myself to the precise construction and arrangement of parts shown and described, I claim—

1. In a machine for sowing seed, the combination with a frame, and supporting and pressing rollers, of rotary drill-forming devices, a seed-hopper, a rotary seed-cylinder supported in the bottom of the hopper, seed-tubes to which the cylinder delivers the seed, a rotary device for covering the seed, and means actuated by the rollers for positively rotating the drill-forming devices, the seed-cylinder, and the covering device, substantially as set forth.

2. In a machine for sowing seed, the combination with a frame and supporting and pressing rollers, of rotary drill-forming devices, means for adjusting them vertically, a seed-hopper, a rotary seed-cylinder supported in the bottom of the hopper, seed-tubes to which the cylinder delivers the seed, a rotary device for covering the seed, and means actuated by the rollers for positively rotating all of said rotary devices, substantially as described.

3. In a machine for sowing seed, the combination with a frame and supporting and pressing rollers, of rotary drill-forming devices, a seed-hopper, a rotary seed-cylinder supported in the bottom of the hopper, means actuated by one of the rollers for rotating said cylinder, means for varying the speed of its rotation, seed-tubes to which the cylinder delivers the seed, a rotary device for covering the seed, and means actuated by one of said rollers for positively rotating the covering device, substantially as described.

4. In a machine for sowing seed, the combination with drill-forming devices, of a seed-hopper, a seed-cylinder supported to rotate in the bottom of said hopper, seed-tubes to which the cylinder delivers the seed, a cone-pulley connected to one end of the cylinder, a driven pulley on the machine, a belt connecting the cone-pulley and the driven pulley, a rack slidably supported adjacent to the cone-pulley, a pinion for moving the rack, and fingers adjustably connected to the rack and extending on opposite sides of the belt, substantially as set forth.

5. In a machine for sowing seed, the combination of drill-forming devices, means for delivering seeds into the drills, a rotary Archimedean screw for covering the seed, and a roller for pressing the soil over the seed, substantially as set forth.

6. In a machine for sowing seed, the combination of drill-forming devices, means for delivering seeds into the drills, a rotary Archimedean screw for covering the seed, means for adjusting said screw vertically with respect to the ground, and a roller for pressing the soil over the seed, substantially as set forth.

7. In a machine for sowing seed, a drill-forming device consisting of a plurality of pairs of truncated cones, the cones of each pair abutting at their bases, a shaft upon which said cones are supported to turn therewith, and means actuated by a moving part of the machine for positively rotating said shaft, substantially as set forth.

8. In a machine for sowing seed, a drill-forming device consisting of a plurality of pairs of truncated cones, the cones of each pair abutting at their bases, and a shaft upon which said cones are supported to turn therewith, combined with a serrated plate yieldingly supported in engagement with the cones, and means actuated by a moving part of the machine for positively rotating said shaft, substantially as set forth.

9. In a machine for sowing seed, the combination of a rotary shaft, pairs of truncated cones on said shaft the cones of each pair abutting base to base, means for rotating said shaft and cones to form drills, means for delivering seed to the drills, an Archimedean screw for leveling the soil and covering the seed, and a roller for pressing the soil over the seed, substantially as set forth.

10. In a machine for sowing seed, the combination with a frame and a supporting-roller at each end of the frame, of a rotary drill-forming device journaled in said frame near one roller, a rotary soil-leveling and seed-covering device journaled in the frame near the other rollers, and means for transmitting movement from the rollers to the drill-forming and the seed-covering devices respectively, substantially as set forth.

In testimony whereof I have signed my name to this specification in the presence of two subscribing witnesses.

THOMAS ADAIR.

Witnesses:
MALCOLM T. BRICE,
HUGH HYNDMAN.